G. H. DAY.
GOGGLES.
APPLICATION FILED DEC. 26, 1917.
1,265,625.
Patented May 7, 1918.
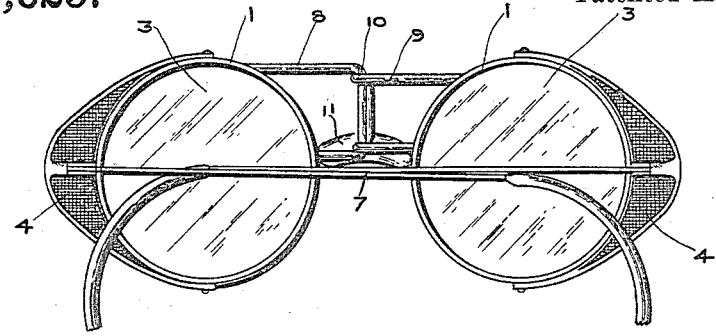
FIG. I
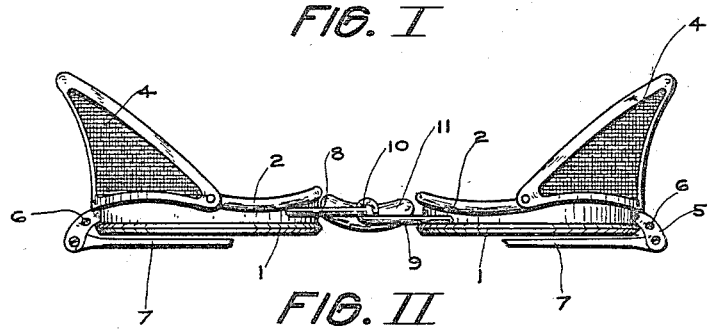
FIG. II
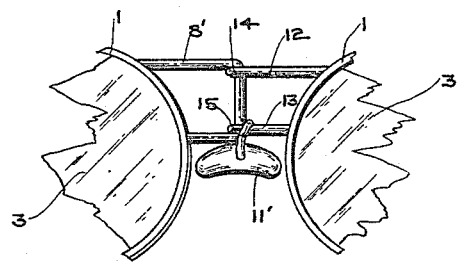
FIG. III
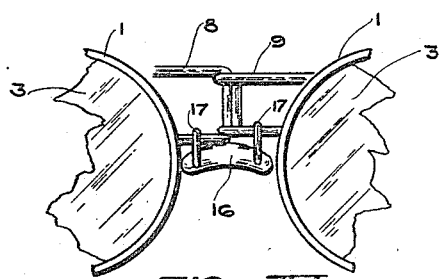
FIG. IV
INVENTOR
GEORGE H. DAY
BY
H. H. Styll  H. H. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

1,265,625.  Specification of Letters Patent.  Patented May 7, 1918.

Application filed December 26, 1917. Serial No. 208,943.

*To all whom it may concern:*

Be it known that I, GEORGE H. DAY, a citizen of the United States, residing at Southbridge, in the county of Worcester and State of Massachusetts, have invented certain new and useful Improvements in Goggles, of which the following is a specification.

This invention relates to new and useful improvements in goggles, and more particularly to a pivotal connection for the lens frames of a pair of goggles, the main object of the present invention being the provision of a loose connection between the lens frames whereby the frames can be readily fitted to the face of the wearer and at the same time this pivotal connection support the nose bridge.

Another object of the present invention is the provision of a pair of goggles whereby the lens frames are pivotally connected together so that they may be readily folded, whereby they may be packed in a small case or easily carried within the pocket.

A further object of the invention is the provision of a pair of goggles whereby the lens frames are so connected that they may be moved toward or away from the face and at the same time move the nose bridge so that it may be readily accommodated to the nose of the wearer.

With the above and other objects in view the invention consists in the novel features of construction, the combination and arrangement of the parts hereinafter more fully set forth, pointed out in the claims and shown in the accompanying drawings, in which:

Figure I is a front elevation of a pair of goggles constructed in accordance with my invention, illustrating the temples in folded position.

Fig. II is a top plan view.

Fig. III is a detail front elevation illustrating a slightly modified form of bridge connection.

Fig. IV is a similar view illustrating still another form of bridge connection.

In the construction of my improved goggles I provide a pair of lens frames, indicated by the numeral 1, which may be formed of any material suitable for the purpose, and provided upon their inner edges with a smooth rounded surface, as indicated at 2, which contacts with the face, and in view of the smooth surface thereon will not scratch or irritate the face of the wearer. Arranged within the frames 1 at the front thereof are the lenses 3, and pivotally connected at diametrically opposite points to the central portions of the frames 1 are the screen members 4 adapted to be folded inwardly upon the frames when not in use, or disposed for use in the position illustrated in Fig. II.

The lens frames 1 are connected at the outer sides thereof by means of the temple straps 5 which are securely held together by means of the screws 6. Pivotally connected between the outer edge of the straps 5 are the usual temples 7, whereby my improved goggles may be secured in position upon the face of the wearer.

In order to loosely connect the lens frames 1, I employ two substantially U-shaped members, indicated by the numerals 8 and 9, the member 8 having its ends secured in spaced relation to the inner side of one of the lens frames, while its central portion is extended substantially midway of the two frames. The member 9 is secured at its ends upon the inner side of the opposite frame member and its intermediate portion extended inwardly substantially midway between the two lens frames, and the side portions thereof are looped to provide spaced eyelets 10 embracing the intermediate portion of the member 8, thus forming a suitable pivotal connection for the two members 8 and 9.

The saddle 11 of the nose bridge may be soldered or otherwise secured to the lower side portion of the member 8, or if desired may be suspended from both of the members 8 and 9 in any suitable manner.

From the above description it will be readily apparent that I have provided a suitable pivotal connection between the two lens frames, whereby when the same are applied to the face of the wearer they will be readily accommodated thereto.

In Fig. III, I have illustrated a slightly modified form of the invention wherein the member 8' is of substantially the same form as the member 8 illustrated in Figs. I and II, and connected to the intermediate portion of this member 8' are the members 12 and 13, the member 12 having one end secured in any suitable manner to one of the lens frames, while the other end thereof is bent upon itself and engaged with the intermediate portion of the member 8' adjacent the outer side portion, as illustrated at 14. The member 13 is connected at its inner end to the lens frame and thence extended toward the member 8' and looped around the intermediate portion thereof, as shown at 15, while the end of the member 13 is curved over the body portion of the member 13 and downwardly to support the saddle 11' in its proper position.

It will be readily apparent that this form of the invention is somewhat similar to the preferred form as illustrated in Figs. I and II, and will permit of a ready swinging movement of the lens frames 1.

In Fig. IV, I have illustrated still another modified form of the invention wherein the saddle 16 of the nose bridge is provided with spaced supporting arms 17, the outer ends of which are looped upon themselves and mounted for swinging movement upon the lower side portions of the members 8 and 9, whereby the saddle 16 can be readily swung into position in accordance with the adjustment of the lens frames.

I claim:

1. In a device of the class described, including lens frames, U-shaped members having their ends connected with the frames, and one of said members having its side portions looped upon the intermediate portion of the other member to provide a pivotal connection between the lens frames, and a nose bridge suspended from the pivotal connection.

2. In a device of the class described, including a pair of lens frames, U-shaped members having their ends connected with the frames, one of said members having its side portions looped around the intermediate portion of the other member to provide eyelets embracing the intermediate portion of the second frame, whereby to provide a pivotal connection between the two frames, and a nose bridge supported by the pivotal connection.

3. A device of the class described including lens frames, U-shaped members having their ends connected with the frames and their intermediate portions secured together to provide a pivotal connection between the lens frames and a nose bridge suspended from the pivotal connection.

In testimony whereof I have affixed my signature, in presence of two witnesses.

GEORGE H. DAY.

Witnesses:
WM. P. CHASE,
WILLIAM B. JONES.

Copies of this patent may be obtained for five cents each, by addressing the "Commissioner of Patents Washington, D. C."